(12) United States Patent
Manabe et al.

(10) Patent No.: US 9,722,406 B2
(45) Date of Patent: Aug. 1, 2017

(54) UNDERSEA CABLE, UNDERSEA CABLE INSTALLATION STRUCTURE, AND METHOD FOR INSTALLING UNDERSEA CABLE

(71) Applicant: FURUKAWA ELECTRIC CO., LTD., Tokyo (JP)

(72) Inventors: Hiroki Manabe, Tokyo (JP); Toru Kagoura, Tokyo (JP); Takahiro Sasaki, Tokyo (JP); Yoshihiro Shimada, Tokyo (JP); Takeharu Yamaguchi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/180,796

(22) Filed: Jun. 13, 2016

(65) Prior Publication Data

US 2016/0301198 A1  Oct. 13, 2016

Related U.S. Application Data

(63) Continuation of application No. PCT/JP2015/050664, filed on Jan. 13, 2015.

(30) Foreign Application Priority Data

Jan. 20, 2014 (JP) .................................. 2014-007786

(51) Int. Cl.
*H02G 15/08* (2006.01)
*H02G 9/12* (2006.01)
(Continued)

(52) U.S. Cl.
CPC ............... *H02G 9/12* (2013.01); *H01B 7/045* (2013.01); *H01B 7/204* (2013.01); *H01B 7/2806* (2013.01);
(Continued)

(58) Field of Classification Search
CPC ... H01B 7/02; H01B 7/04; H01B 7/06; H01B 7/14; H01B 7/12; H01B 7/17;
(Continued)

(56) References Cited

U.S. PATENT DOCUMENTS

| 4,104,479 | A | * | 8/1978 | Bahder | .................. | H02G 15/25 |
| | | | | | | 174/22 R |
| 4,224,462 | A | * | 9/1980 | Occhini | ............... | H01B 9/0611 |
| | | | | | | 174/25 G |

(Continued)

FOREIGN PATENT DOCUMENTS

| JP | 2001-210150 A | 8/2001 |
| JP | 2002-534942 A | 10/2002 |
| JP | 2013-045552 A | 3/2013 |

OTHER PUBLICATIONS

Apr. 21, 2015 Search Report issued in International Patent Application No. PCT/JP2015/050664.

*Primary Examiner* — William H Mayo, III
(74) *Attorney, Agent, or Firm* — Oliff PLC

(57) ABSTRACT

Ocean floating installations (1) are disposed on the ocean. The ocean floating installations (1) float on the ocean with the lower part of the ocean floating installations (1) being fixed to the seabed by mooring ropes (11). Each of the ocean floating installations (1) is connected at a connection part (5a) to a cable (3), which is a first cable. Each of the cables (3) is connected at a connection part (5b) to a cable (7), which is a second cable. In other words, the ocean floating installations (1) are connected to each other by the cables (3) and the cable (7). A connection is established with the cables (7) at the connection parts (5b) located on the seabed. In other words, the cables (7) are installed on the seabed.

9 Claims, 6 Drawing Sheets

(51) Int. Cl.
*H02G 9/02* (2006.01)
*H01B 7/04* (2006.01)
*H01B 7/282* (2006.01)
*H01B 7/20* (2006.01)
*H01B 7/28* (2006.01)
*H02G 1/10* (2006.01)

(52) U.S. Cl.
CPC ............ *H01B 7/2825* (2013.01); *H02G 1/10* (2013.01); *H02G 9/02* (2013.01)

(58) Field of Classification Search
CPC ...... H01B 7/1875; H01B 7/28; H01B 7/2825; H01B 9/00; H01B 9/02; H02G 9/00; H01R 4/00
USPC ........... 174/102 R, 102 SC, 113 R, 74 R, 78, 174/84 R
See application file for complete search history.

(56) References Cited

U.S. PATENT DOCUMENTS

| | | | | |
|---|---|---|---|---|
| 6,025,560 | A * | 2/2000 | De Buyst | H02G 15/103 174/88 C |
| 6,425,708 | B1 | 7/2002 | Siegfriedsen | |
| 8,716,600 | B2 * | 5/2014 | Kehl | H01R 4/70 174/84 R |
| 2001/0016103 | A1 | 8/2001 | Hoch | |
| 2012/0024565 | A1 * | 2/2012 | Orini | H01B 7/14 174/106 R |
| 2014/0166335 | A1 * | 6/2014 | Kagoura | H01B 7/045 174/107 |

\* cited by examiner

UNDERSEA CABLE, UNDERSEA CABLE INSTALLATION STRUCTURE, AND METHOD FOR INSTALLING UNDERSEA CABLE

TECHNICAL FIELD OF THE INVENTION

This invention relates to undersea cables and the like for ocean floating installations.

BACKGROUND OF THE INVENTION

In recent years, developments for renewable energy have been in progress as a countermeasure against global warming. For example, practical use of floating type off-shore wind power generators that transmit electricity from wind power generators, which are ocean floating installations, has been in progress.

To transmit electricity from ocean floating installations, undersea cables are used. An undersea cable includes three power cables that are assembled and twisted together for three-phase alternating current power transmission and armoring wires provided on the periphery of the core to support the cable load.

Since such undersea cables are laid under the sea, high impermeability is required for the internal power cables. Therefore, an impermeable layer is formed on the periphery of the insulator (shielding layer) in the power cables.

On the other hand, such undersea cables are suspended from ocean floating installations that repeatedly oscillate on the sea. Therefore, the undersea cables always deform repeatedly due to fluid force and oscillation of the floating body caused by waves and tides. Therefore, deformation is also repeatedly given to the power cables.

However, it is difficult for the power cables to follow this repetitive deformation if the impermeability thereof is to be formed by a metal layer such as a metal tape. Therefore, it is likely that the metal layer forming the impermeable layer may be damaged, and it is said that fatigue life of the conventional impermeable layer structure is approximately five to seven years, depending on the conditions of the ocean climate.

As such undersea cables, for example, disclosed is an undersea cable including an impermeable layer formed of a multilayer tape in which a metal layer is interposed by resin and the cross sectional shape of the metal layer of the multilayer tape has alternating protrusion and recess shapes formed continuously and repeatedly thereon (Patent Document 1).

RELATED ART

Patent Document

[Patent Document 1] Japanese Unexamined Patent Application Publication No. 2013-045562 (JP-A-2013-045552)

SUMMARY OF THE INVENTION

Problems to be Solved by the Invention

However, under the conditions where water pressure is applied, it is difficult to securely obtain a perfect impermeability with such impermeable layers. Particularly when installed in deep water, it is sometimes impossible to obtain the required impermeability performance.

The present invention was achieved in view of such problems. Its object is to provide an undersea cable and the like that can establish both sufficient flexibility and high impermeability.

Means for Solving Problems

To achieve the above object, the first invention is an undersea cable comprising a first cable having an impermeable layer formed by winding a tape-shaped component and a second cable having an impermeable layer formed of a lead sheath wherein the second cable is placed between a pair of the first cables to be connected thereto. Each of the cables comprises at least a power cable and armoring portions. The power cable includes a conductor on which an insulating layer, a shielding layer, an impermeable layer, and an anti-corrosive layer are formed in sequence. The armoring portions are formed by disposing a plurality of wire material on the periphery side of the whole of a plurality of the power cables in the circumferential direction of the periphery of the whole power cables and providing the wire materials helically in the axial direction of the power cables.

Thus, the second cable having an impermeable layer formed of a lead sheath has an almost perfect impermeability. On the other hand, the first cables, which are connected to both ends of the second cable, include impermeable layers formed of tape-shaped components. Therefore, its flexibility is better than a cable formed of a lead sheath such as the second cable. Thus, a cable having a particularly excellent impermeability but less flexibility can be used for the parts in deep water (the parts that are in contact with the seabed), and a cable having an excellent flexibility but relatively less impermeability can be disposed for the parts floating in the ocean. Therefore, both required impermeability and flexibility can be established.

The tape-shaped component is a multilayer tape in which a metal layer is interposed by resin layers. It is preferable that the metal layer of the multilayer tape has at least either protrusion portions or recess portions that are repeatedly formed thereon.

Such structure can further improve the flexibility of the first cable.

An external impermeable layer is provided on the periphery side of the armoring portions. The external impermeable layer of the first cable may be formed by winding a tape-shaped component and the external impermeable layer of the second cable may be formed of a lead sheath.

As above, in the present invention, the similar structure can be used for both the impermeable layer of the power cables and the impermeable layer of the external protective layer.

The second invention is an undersea cable installation structure that is installed undersea, the undersea cable comprising a first cable having an impermeable layer formed by winding a tape-shaped component and a second cable having an impermeable layer formed of a lead sheath, wherein the second cable is placed between a pair of the first cables to be connected thereto, and an end of the first cable is connected to a floating installation. Each of the cables comprises at least a power cable and armoring portions. The power cable includes a conductor on which an insulating layer, a shielding layer, an impermeable layer, and an anti-corrosive layer are formed in sequence. The armoring portions are formed by disposing a plurality of wire material on the periphery side of the whole of a plurality of the power cables in the circumferential direction of the periphery of the whole power cables and providing the wire materials helically in the axial direction of the power cables.

In this way, the first cable which is excellent in flexibility can be used for both end parts of the undersea cable between the floating installations, and the second cable which is excellent in impermeability can be used for the parts in deep water. Therefore, both impermeability and flexibility can be established.

Preferably, the second cable is positioned on the seabed over the full length thereof.

By disposing the second cable having relatively less flexibility completely on the seabed, the influence of oscillations caused by waves and tides on the second cable can be reduced, and fractures and the like of the impermeable layer caused by repetitive bending can be suppressed.

The length of each of the first cables is equal to or greater than the water depth and it is preferable that the following relationship is satisfied: $[\int P_{WR1} (L) dL + \int P_{WR2} (L) dL]/(L_{R1} + L_S + L_{R2}) < 760 \times 10^{-7}/P_R$, wherein $P_{WR1}$ (L) is a water pressure (mmHg) given to one of the first cables at a position of a length L, $P_{WR2}$ (L) is a water pressure (mmHg) given to the other first cable at a position of the length L, $L_{R1}$ is a full length (m) of one of the first cables, $L_{R2}$ is a full length (m) of the other first cable, $L_s$ is a full length (m) of the second cable, and $P_R$ is an impermeability performance of the first cable (g·cm/cm²·day·mmHg).

By satisfying the above relationship, the second cable having a high impermeability can be disposed at the part that does not requires a high flexibility, so that the impermeability required can be established for the undersea cable as a whole.

The third invention is a method for installing an undersea cable including a first cable having an impermeable layer formed by winding a tape-shaped component and a second cable having an impermeable layer formed of a lead sheath. Each of the cables comprises at least a power cable and armoring portions. The power cable includes a conductor on which an insulating layer, a shielding layer, the impermeable layer, and an anti-corrosive layer are formed in sequence. The armoring portions are formed by disposing a plurality of wire material on the periphery side of the whole of a plurality of the power cables in the circumferential direction of the periphery of the whole power cables and providing the wire materials helically in the axial direction of the power cables. The method comprises steps of connecting a pair of the first cables to floating installations that are distant from one another and connecting the pairs of the first cables by the second cable on the ocean.

Alternatively, the fourth invention is a method for installing an undersea cable including a pair of first cables each of which has an impermeable layer formed by winding a tape-shaped component and a second cable having an impermeable layer formed of a lead sheath. Each of the cables comprises at least a power cable and armoring portions. The power cable includes a conductor on which an insulating layer, a shielding layer, the impermeable layer, and an anti-corrosive layer are formed in sequence. The armoring portions are formed by disposing a plurality of wire material on the periphery side of the whole of a plurality of the power cables in the circumferential direction of the periphery of the whole power cables and providing the wire materials helically in the axial direction of the power cables. The method comprises steps of connecting one of the first cables and the second cable with each other in advance, connecting the pair of the first cables to floating installations that are distant from one another, and connecting the other first cable with the second cable on the ocean.

Alternatively, the fifth invention is a method for installing an undersea cable including a pair of first cables each of which has an impermeable layer formed by winding a tape-shaped component and a pair of second cables, each of which has an impermeable layer formed of a lead sheath. Each of the cables comprises at least a power cable and armoring portions. The power cable includes a conductor on which an insulating layer, a shielding layer, the impermeable layer, and an anti-corrosive layer are formed in sequence. The armoring portions are formed by disposing a plurality of wire material on the periphery side of the whole of a plurality of the power cables in the circumferential direction of the periphery of the whole power cables and providing the wire materials helically in the axial direction of the power cables. The method comprises steps of connecting each of the first cables and each of the second cable with each other in advance, connecting the pair of the first cables to floating installations that are distant from one another, and connecting the second cables to one another on the ocean.

Connecting the first cables, an end of which is connected to a floating installation, with each other by the second cables on the ocean as above enables to install an undersea cable over a long distance. At this time, the second cables can be connected for the parts that are disposed on the seabed. Also, for large floating installations, for example, it is sometimes difficult for cable ships to approach the floating installations and, in such cases, it is impossible to install a continuous cable. However, in the present invention, a plurality of cables can be joined together on the ocean so that it is applicable for a large floating installation. Also, since the second cables including lead sheath are cheaper than the first cables, it is possible to reduce the cost compared to the case in which all the cables are formed with the first cables.

Also, if a continuous undersea cable is damaged in an accident or the like, it is necessary to replace the full cable or to cut the damaged part and reconnect the cable. However, if an undersea cable formed by a plurality of cables is used, the replacement is required only for the cable that has the damaged part and restoration from the damage is easy.

Effects of the Invention

The present invention can provide an undersea cable and the like that can establish both sufficient flexibility and high impermeability.

DESCRIPTION OF SOME EMBODIMENTS

Hereinafter, an undersea cable and the like according to embodiments of the present invention will be described.

Figure 1:
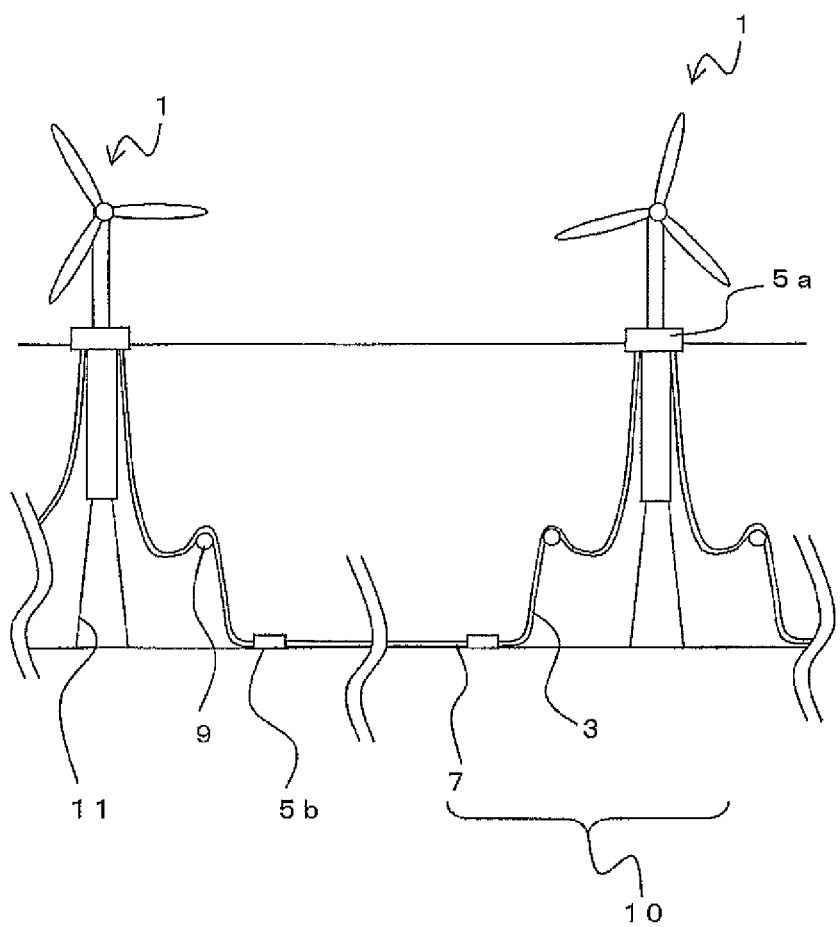
FIG. 1 shows an ocean floating installation 1.

FIG. 1 shows the installation state of an undersea cable 10. An ocean floating installation 1 is disposed on the sea. The ocean floating installation 1 is, for example, a floating type ocean wind power generator. The ocean floating installation 1 floats on the sea and the lower part thereof is fixed to the seabed with a mooring rope 11.

A plurality of the ocean floating installations 1 are disposed on the sea. Each of the ocean floating installations 1 is connected with a cable 3, which is a first cable, at a connection part 5a. Also, each of the cables 3 is connected with a cable 7, which is a second cable, at a connection part 5b. That is, the ocean floating installations 1 are connected with one another by the cables 3 and the cables 7.

A buoy 9 is connected between the connecting part 5a and the connecting part 5n of the cable 3. That is, a part of the cable 3 floats in the sea because of the buoy 9. The buoy 9 is not always necessary and may not be used. The cable 3 will be described in detail later.

The cable 7 is connected with the cable 3 at the connection part 5b placed on the seabed. That is, the cable 7 is placed on the seabed over an approximately full length thereof. In the present invention, the undersea cable 10 refers to the whole of the cables 3 and the cables 7 that are connected with each other.

Here, the ocean floating installation 1 oscillates largely due to waves, tides, and the like on the sea. Therefore, the cable 3 connected to the ocean floating installation 1 follows the oscillation of the ocean floating installation 1 and repeatedly receives large bending deformation in the sea. However, since the cable 3 floats in the sea, the cable 3 does not drag along the seabed and, also, is prevented from being locally given the stress by rise and fall of the tide and ocean currents.

On the other hand, the cable 7 is always in contact with the seabed. Therefore, the effect of repetitive bending deformation caused by the oscillation of the ocean floating installation 1 due to waves, tides, and the like on the sea is small.

Such a cable installation structure can be installed as described below for example. First, cables 3 are connected to each of the ocean floating installations 1. Next, each of the pairs of the cables 3 is carried by ship to connect the other ends of the cables 3 with the cable 7. In this way, the undersea cable 10 (a connected cable of the cables 3 and the cables 7) of a long distance can be installed with certainty.

Alternatively, one of the cables 3 and the cable 7 may be connected at the factory and the like beforehand, instead of connecting the cable 7 and a pair of the cables 3 on the ocean. In this case, the cable 3 is connected to each of the ocean floating installations 1 first, and then the other cable 3 and the cable 7 may be connected.

Alternatively, a pair of the cables 3 and a pair of the cables 7 may be used instead of using the cable 7 and a pair of the cables 3. In this case, although all of the cables may be connected on the ocean, the first cable 3 and the first cable 7 may be connected at the factory and the like beforehand and the second cable 3 and the second cable 7 may be connected at the factory and the like beforehand. In this case, each of the cables 3 is connected to each of the ocean floating installations 1 on the ocean, and then the cables 7 may be connected with one another.

Figure 2:
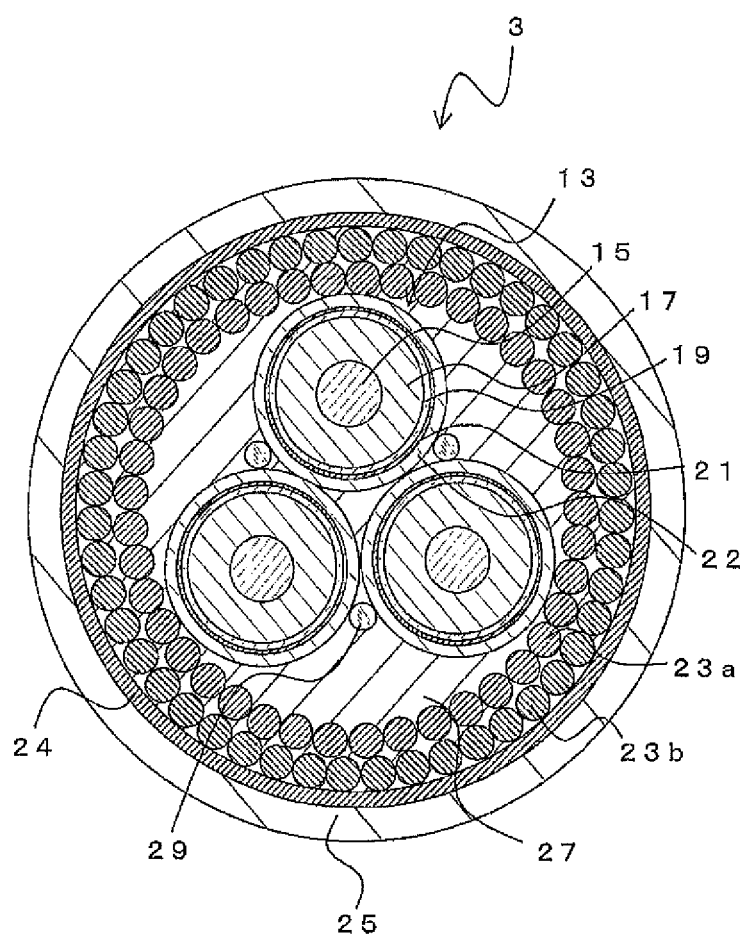
FIG. 2 is a cross sectional view of a cable 3.

Next, the structure of the cable 3 will be described. FIG. 2 is a cross section of the cable 3. The cable 3 mainly includes power cables 13, armorings 23a, 23b, an external corrosion-protective layer 25, and the like.

The power cable 13 includes a conducting portion 15, an insulating portion 17, a shielding layer 19, an impermeable layer 21, a corrosion-protective layer 22, and the like. The conducting portion 15 is formed, for example, by twisting copper wires together. The conducting portion 15 may be formed by a large number of copper wires having smaller diameters, without being compressed at the time of twisting so to be pliable and flexible.

The insulating portion 17 is provided on the external periphery of the conducting portion 15. The insulating portion 17 is made of, for example, cross-linked polyethylene. The insulating portion 17 may include three layers of an internal semiconducting layer, an insulating layer, and an external semiconducting layer. The three-layered structure with the internal semiconducting layer, the insulating layer, and the external semiconducting layer can suppress water tree deterioration, which is a partial discharging phenomenon, and can provide an effect as a mechanical buffer layer between the insulator and the metal layer.

For example, if a conductor and an insulator or a shield and an insulator are in direct contact and there are protrusions and the like on the contacting surface, an electric field is concentrated thereto, which becomes an original point for generation of water tree or partial discharge. Thus, interposing semiconducting resin in between can moderate the electric field on the contacting surface. These internal and external semiconducting layers are sometimes called 'electric field relaxing layers'.

Also, if there is no internal semiconducting layers or external semiconducting layers, there is a possibility that the metal layer and the like of the conductor or the shield may eat into the insulator directly. If the metal layer eats into the insulator, partial discharge occurs due to concentration of the electric field, resulting in an insulation breakdown. Therefore, forming semiconducting resin layers between the insulator and the metal layer can prevent such a problem.

The shielding layer 19 is provided on the periphery of the insulating portion 17. The shielding layer 19 is made of conducting materials such as metals, conducting resin, or conducting fibers. The shielding layer 19 is connected to a ground at the end part of the cable 3.

The impermeable layer 21 is provided on the periphery of the shielding layer 19. The impermeable layer 21 includes, for example, a multilayer tape which is a laminate of a metal layer and resin layers. The structure of the multilayer tape will be described later.

The corrosion-protective layer 22 is provided on the periphery of the impermeable layer 21. The corrosion-protective layer 22 is made of, for example, resin which is extrusion coated on the periphery of the impermeable layer 21. The corrosion-protective layer 22 is for protecting each of the layers inside. For the corrosion-protective layer 22, polyamide resin such as polyethylene, ethylene-1-butene copolymer, ethylene-vinyl acetate copolymer, ethylene-ethyl acrylate copolymer, ethylene-propylene-diene terpolymer, nylon 6-6, nylon 12, and nylon 11, polyarylate resin, or non-cross-linked polyvinyl chloride resin may be used for example.

The three power cables 13 that are structured as above are assembled and twisted together for three-phase alternating current power transmission. Also, after assembling and twisting the three power cables 13 together, an intermediate layer 27 such as resin string is formed in the gap to form an approximately circular core. An armoring portion that supports the load of the cable 3 is provided on the periphery of the core obtained. Also, communication cables such as optical cables 29 may be provided in the intermediate layer 27 if necessary. Here, in order to decrease the effects of the bending deformation caused by the deformation of the cables as much as possible, it is preferable to provide the optical cables at three positions that are in contact with the two corrosion-protective layers 22 of the neighboring cable conductors in the intermediate layer 27. Such arrangement can stabilize the positions of the communication cables and, at the same time, decrease the stress applied to the communication cables since the communication cables can be located at the positions close to the center.

The armoring portion includes, for example, two layers of the armorings 23a and 23b. The armorings 23a and 23b are made of, for example, wire materials such as metal wires (copper wire or stainless wire) or fiber reinforced plastic wires. The armoring portion has a plurality of the armorings 23a and 23b arranged side by side in the circumferential direction respectively and wound around the periphery of the core at a long pitch without any gaps. That is, the armorings 23a and 23b are formed so that the winding pitch is long enough compared with the outer diameter of the armorings 23a and 23b. The armoring 23a on the inner circumference side and the armoring 23b on the outer circumference side are wound spirally around the periphery of the core in the directions opposite to each other. Winding the armorings 23a and 23b spirally in the opposite directions to each other can prevent the cable 3 from twisting when the cable 3 receives bending and oscillations.

An impermeable layer 24 is provided on the periphery of the armoring portion (the armorings 23a and 23b) if necessary. The impermeable layer 24 has a structure similar to that of the impermeable layer 21. Also, an external corrosion-protective layer 25 is provided on the periphery of the impermeable layer 24. Alternatively, the external corrosion-protective layer 25 may be provided directly on the periphery of the armoring portion without providing the impermeable layer 24. The external corrosion-protective layer 25 is made of, for example, resin that is extrusion coated on the periphery of the armoring portion. Polyolefin resin or polyamide resin (polyamide 11, polyamide 12, or the like) can be used as the resin to form the external corrosion-protective layer 25 for example.

Figure 3:
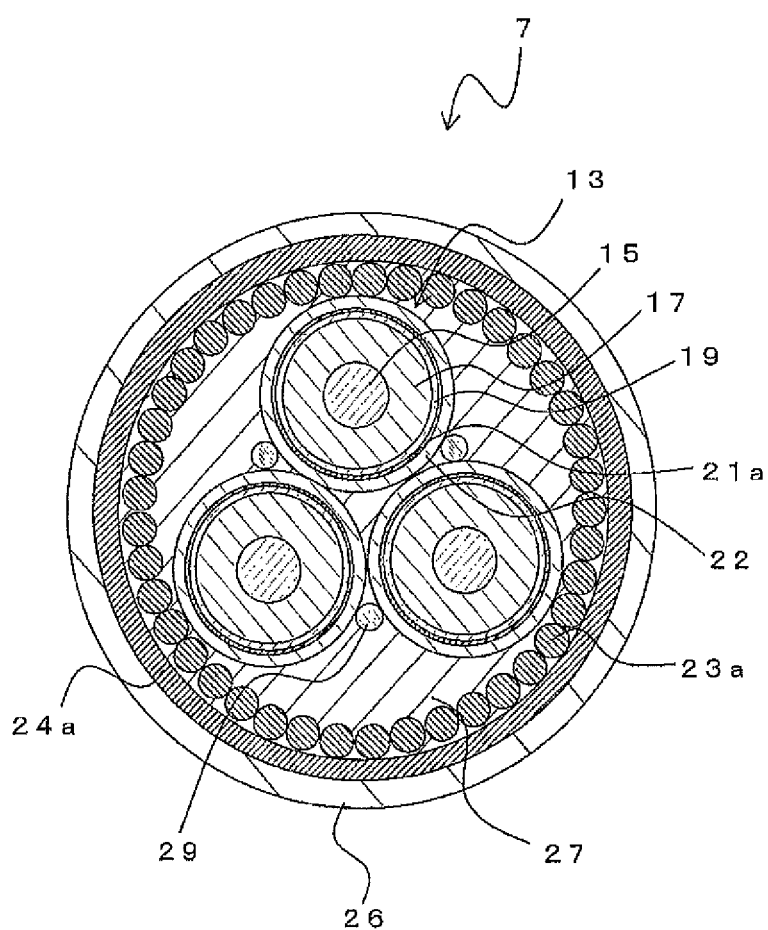
FIG. 3 is a cross sectional view of a cable 7.

FIG. 3 is a cross sectional view of the cable 7. Since the cable 7 has an approximately the same structure as the cable 3, the same notations in FIG. 2 will be used for the structure similar to the cable 3 and redundant descriptions will be omitted. The cable 7 has a structure approximately similar to that of the cable 3, but the structures of an impermeable layer 21a and 24a, the armoring 23a, and an external protective layer 26 are different. The external protective layer 26 is formed by winding PP yarn.

The impermeable layer 21a of the cable 7 is not formed by a multilayer tape, but by a lead sheath. The lead sheath is, for example, extrusion coated on the periphery of the shielding layer 19. With the lead sheath, approximately perfect impermeability can be obtained.

Also, the cable 7 includes one layer of the armoring 23a. Since the cable 7 is disposed on the seabed, the cable 7 is less influenced by the oscillations and bending due to waves and the like. Therefore, countermeasures against twisting may be considered less than the cable 3. Also, tension force is not given to the cable 7 after installation since the cable 7 is a part installed on the seabed. Therefore, the armoring 23a is formed as one layer. Alternatively, the cable 7 may have a two-layered armoring structure.

An impermeable layer 24a is provided on the periphery of the armoring 23a if necessary. The impermeable layer 24a has a structure similar to that of the impermeable layer 21a. Also, the external protective layer 26 is provided on the periphery of the impermeable layer 24a. Alternatively, the external protective layer 26 may be provided directly on the periphery of the armoring portion without providing the impermeable layer 24a.

Figure 4A:
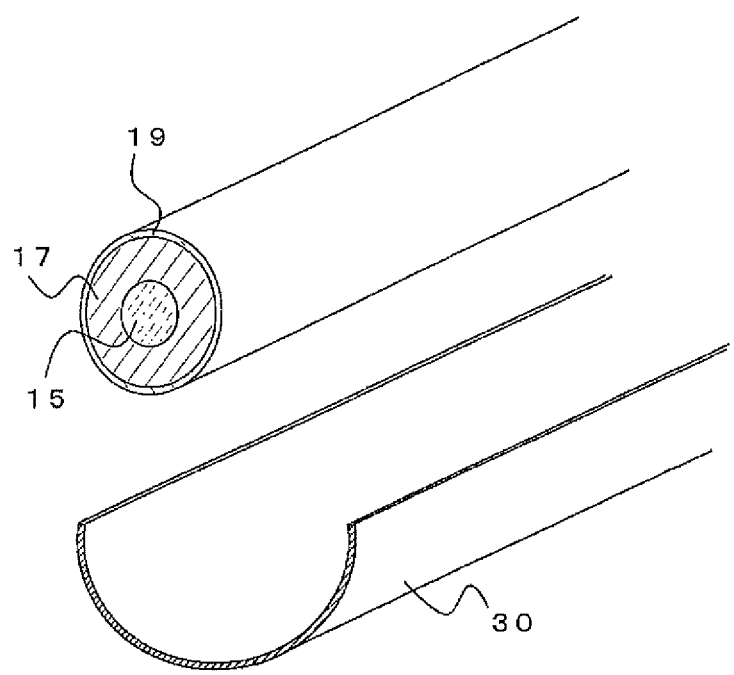
FIG. 4(a) shows a state before a multilayer tape is wound.
Figure 4B:
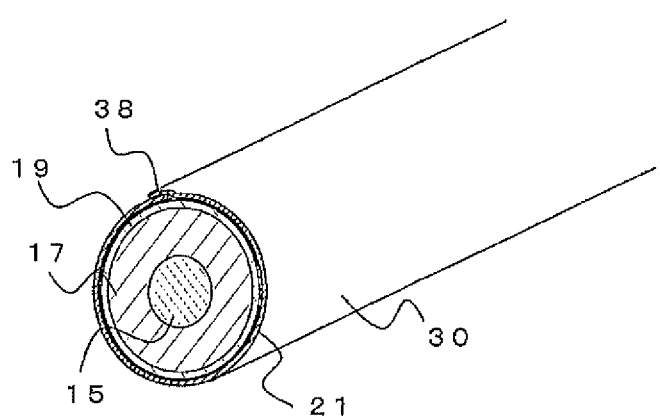
FIG. 4(b) shows a state in which the multilayer tape 30 is longitudinally wound around.

Next, a method for forming the impermeable layer 21 of the cable 3 will be described. FIG. 4(a) and FIG. 4(b) show a forming process in which the multilayer tape 30 is longitudinally wound around the power cable 13 having the shielding layer 19 formed thereon. The insulating portion 17 is formed on the periphery of the conducting portion 15 in advance and then the shielding layer 19 is formed on the periphery thereof. The multilayer tape 30, which is a tape-shaped material, is wound around the periphery of the shielding layer 19.

Here, it is preferable that the multilayer tape 30 is longitudinally wound as shown in FIG. 4(a). In this case, the multilayer tape 30 is sent to the power cable 13 so that the longitudinal direction of the multilayer tape 30 is approximately in the same direction as the axial direction of the power cable 13. At this time, both sides of the multilayer tape 30 are bent in U-shape so as to wrap the entire power cable 13 (the shielding layer 19).

Furthermore, the power cable 13 (the shielding layer 19) is wrapped up by the multilayer tape 30. That is, as shown in FIG. 4(b), the multilayer tape 30 wraps the shielding layer 19 up by lapping over both ends of the multilayer tape 30 on the periphery of the shielding layer 19. That is, a lapped part 38 is formed along the axial direction of the power cable 13. As above, the multilayer tape 30 is wound longitudinally around the power cable 13 (the shielding layer 19) to form the impermeable layer 21.

Thus, by winding the multilayer tape 30 so that the longitudinal direction of the multilayer tape 30 is approximately in the same direction as the axial direction of the power cable 13, the width direction of the multilayer tape 30 is in the circumferential direction of the power cable 13, and the ends of the wound portion wound in the circumferential direction are lapped over each other, the full length of the lapped part of the multilayer tapes 30 with regard to the total length of the power cable 13 can be shortened compared to the case of lapping with spiral winding.

That is, although a resin portion is slightly formed between the metal layers 31 at the lapped portion 38, shortening the full length of the lapped portion allows the resin portion between the metal layers 31 to decrease with regard to the total length of the power cable 13. Also, since the longitudinal winding makes the lapped portion 38 to be formed straightly in the axial direction of the power cable 13, fusion of the lapped part becomes easy and manufacturability is also excellent. Increasing the lapping margin (the overlapping width) can improve the impermeability.

The corrosion-protective layer 22 is extrusion coated onto the periphery of the impermeable layer 21 formed as above. In this way, the power cable 13 is formed.

Figure 5A:
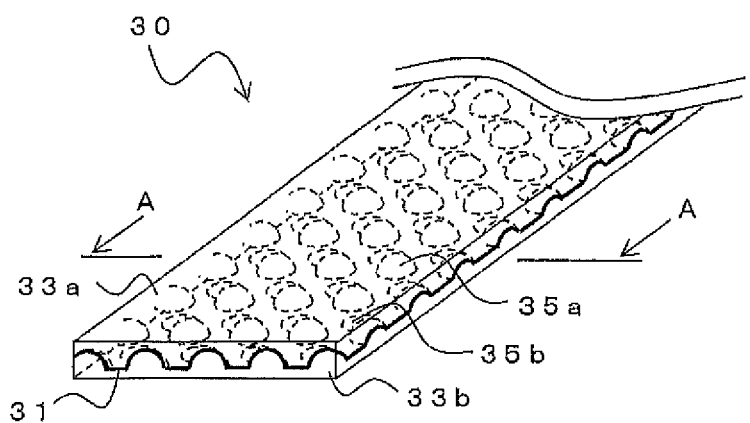
FIG. 5(a) is a perspective view showing a structure of the multilayer tape 30.
Figure 5B:
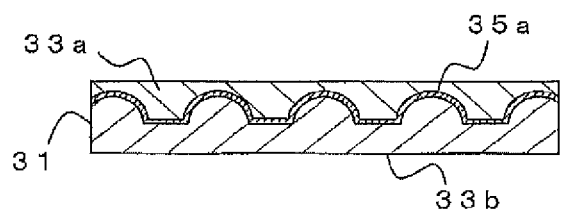
FIG. 5(b) is a cross sectional view taken along A-A line in FIG. 5(a).

Next, the multilayer tape 30 that forms the impermeable layer 21 of the cable 3 will be described. FIG. 5(a) is a perspective view of the multilayer tape 30 and FIG. 5(b) is a cross-sectional view taken along A-A line in FIG. 5(a). The multilayer tape 30 includes a metal layer 31 and resin covering portions 33a and 33b. The metal layer 31 is interposed by the resin covering portions 33a and 33b.

The metal layer 31 may be a thin film, which is easy to be processed, with excellent corrosion-resistance. For example, stainless steel, aluminum, copper, lead, clad steel of which the surface is cladded with a corrosion-resistant material or the like can be used. Here, if weight reduction is important, it is preferable to use stainless steel, aluminum, clad steel, or the like. The thickness of the metal layer 31 is, for example, approximately 0.05 mm and the thickness of the entire multilayer tape 30 may be, for example, approximately 0.2 to 1.0 mm.

The resin covering portions 33a and 33b are resin members and can prevent the metal layer 31 from bending, tearing, and wrinkling at the time of constructing the impermeable layer 21.

Approximately circular recess and protrusion shapes are formed on the metal layer 31. For example, protrusion portions 35a and recess portions 35b are formed at predetermined intervals on a cross section of the metal layer 31. The arrangement and shapes of the protrusion portions 35a and recess portions 35b are not limited to the examples shown in the drawings. For example, either protrusion portions 35a or recess portions 35b may be repeatedly arranged.

The metal layer 31 as above can be formed, for example, by letting a metal film pass through a roll with recess and protrusion shapes formed on the surface thereof. It is also possible to form the recess and protrusion shapes by press molding of the metal film at predetermined intervals. The recess and protrusion shapes may also be formed by several steps of sequential press (transfer press).

The multilayer tape 30 can be manufactured by extrusion coating the resin onto the metal film processed with the recess and protrusion shapes for example. Or, a metal film with the recess and protrusion shapes may be placed in a corresponding metal mold and the resin may be injected for integration. Or, individually formed resin members and the metal film having the corresponding recess and protrusion shapes may be integrated with commonly known techniques such as bonding or crimping. Also, the metal layer can be formed by vapor deposition on the resin member that has the recess and protrusion shapes formed in advance on the surface thereof.

The height of the recess and protrusion shapes is preferably between 0.2 mm and 0.6 mm and particularly preferable between 0.3 mm and 0.5 mm. If the height of the recess and protrusion shapes is too small, the effect of forming the recess and protrusion shapes is small. If the height of the recess and protrusion shapes is too large, the thickness change becomes large, impairing the durability on the contrary, and deformation of the recess and protrusion shapes may occur at the time of manufacturing.

Also, the pitch of the protrusion portion 35a or the recess portion 35b of the recess and protrusion shapes is preferably between 0.4 and 4 mm. If the recess and protrusion pitch is too small, processing workability is impaired since deformation is concentrated locally at the time of processing the recess and protrusion shapes. If the recess and protrusion pitch is too large, the processing of recess and protrusion shapes becomes easy however, effect of improving the durability becomes less since absorbing effects of the deformation by the protrusion portions 35a and the recess portions 35b becomes less.

Thus, since the metal layer 31 of the multilayer tape 30 has the protrusion and recess shapes, the metal layer 31 can easily follow the deformation when the power cable 13 (the cable 3) bends and deforms.

Figure 6A:
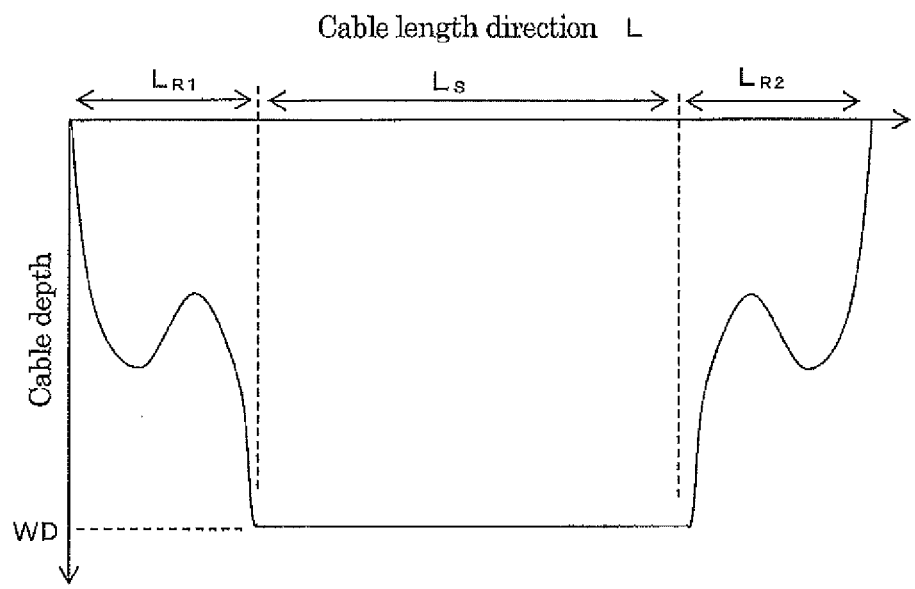
FIG. 6(a) is a schematic view showing a form of installation of the cables.

Next, an installation structure in which the undersea cable 10 is installed in the sea will be described. FIG. 6(a) is a schematic view showing the undersea cable 10 installed in the sea. The horizontal axis of FIG. 6(a) is the position L in the longitudinal direction of the undersea cable 10 and the vertical axis thereof shows the depth from the water surface in the sea.

As mentioned above, the undersea cable 10 includes the cables 3 that are connected on both sides and the cable 7 that is connected between the cables 3. The lengths of the cables 3 on both sides are $L_{R1}$ and $L_{R2}$ respectively, and the length of the cable 7 is $L_s$. Also, the depths (depth of water) to the seabed is WD. Since the cable 7 is installed on the seabed, the cable 7 is approximately fixed at the water depth WD.

Figure 6B:
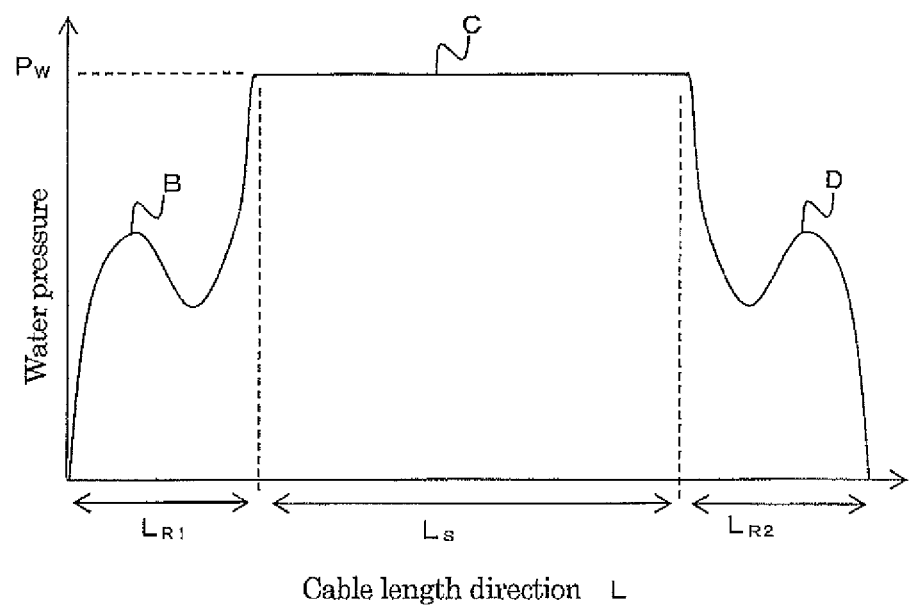
FIG. 6(b) is a graph showing a distribution of water pressure given to the cables.

FIG. 6(b) is a schematic view showing water pressure distribution at each part of the undersea cable 10. B and D in the drawing correspond to the cables 3 and C in the drawing corresponds to the cable 7. Water pressure applied to the undersea cable 10 is proportional to the depth. Therefore, water pressure applied to the cable 7 that is disposed on the seabed is fixed approximately at $P_W$, which is the maximum water pressure.

Here, an impermeability performance (rate of water penetration: $(g \cdot cm)/(cm^2 \cdot day \cdot mmHg)$) $P_R$ of the cable 3 having the impermeable layer 21 formed by the multilayer tape is usually in the range of $10^{-11} < P_R < 10^{-7}$.

Also, the impermeability performance P of an undersea cable can be expressed as below:

$$P = Q \cdot t / (\pi D \cdot L \cdot P_a) \quad (1)$$

where Q is the speed of water permeation (g/day), t is the thickness (cm) of the cable sheath (the corrosion-protective layer), D is the outer diameter (cm) of the cable sheath, L is the length (cm) of the cable, and $P_a$ is the atmospheric pressure (mmHg).

Also, the speed of water permeation Q can be expressed as:

$$Q = P_R \cdot \int P_{WR}(L) dL \cdot \pi D / t \quad (2)$$

where PWR is the external water pressure (mmHg) at each part.

The impermeability performance required for the undersea cable is $P < 10^{-7}$. From the equation (2), the speed of water permeation Q increases as the external water pressure increases, which increases (deteriorates) the impermeability performance according to the equation (1). As a result, the relationship $P < 10^{-7}$ may not be satisfied.

Thus, in the present invention, the cables 3 and 7 having different impermeability performances respectively are joined together.

The impermeability performance $P_{total}$ in this case is:

$$P_{total} = Q_{total} \cdot t / (\pi D \cdot L_{total} \cdot P_a) \quad (3)$$

where $P_{total}$ is the impermeability performance $(g \cdot cm)/(cm^2 \cdot day \cdot mmHg)$ of the whole cable, $Q_{total}$ is the speed of water permeation (g/day) of the whole cable, and $L_{total}$ is the total length (cm) of the cable.

Also, $$Q_{total} = Q_{R1} + Q_S + Q_{R2} \quad (4)$$

$$L_{total} = L_{R1} + L_S + L_{R2} \quad (5)$$

where $Q_{R1}$ and $Q_{R2}$ are the speeds of water permeation (g/day) of the cables 3, $Q_S$ is the speed of water permeation (g/day) of the cable 7, $L_{R1}$ and $L_{R2}$ are the lengths (cm) of the cables 3, and $L_S$ is the length (cm) of the cable 7.

Since the cable 7 is required to be disposed on the seabed, $L_{R1}, L_{R2} > WD$ must be satisfied. Also, in the descriptions below, it is considered that the cables 3 and 7 have common thickness t (cm) of the cable sheath (the corrosion-protective layer) and outer diameter D (cm) of the cable sheath (the corrosion-protective layer).

$$Q_{R1}=P_{R1}\cdot \int P_{WR1}(L)dL \cdot \pi D/t \quad (6)$$

$$Q_{R2}=P_{R2}\cdot \int P_{WR2}(L)dL \cdot \pi D/t \quad (7)$$

where $P_{R1}$ and $P_{R2}$ are the impermeability performance of the cables 3 ((rate of water penetration: (g·cm)/(cm²·day·mmHg)) and $P_{WR1}$ (L) and $P_{WR2}$ (L) are the external water pressure (mmHg) at the position of the length L of the cables 3.

Also, $$Q_S=P_S \cdot P_W \cdot \pi D \cdot L_S/t \quad (8)$$

Here, the impermeability performance $P_S$ of the cable 7 with the lead sheath is approximately zero, therefore $Q_S=0$.

For the impermeability performance of the whole cable $P_{total}$ to satisfy $10^{-7}$, from the equations (3) to (5):

$$(Q_{R1}+Q_S+Q_{R2})\cdot t/(\pi D \cdot (L_{R1}+L_S+L_{R2})\cdot P_a)<10^{-7} \quad (9)$$

Also, from the equations (6) to (8):

$$P_R\cdot[\int P_{WR1}(L)dL+\int P_{WR2}(L)dL]/(L_{R1}+L_S+L_{R2})<P_a\cdot 10^{-7} \quad (10)$$

Therefore, $$[\int P_{WR1}(L)dL+\int P_{WR2}(L)dL]/(L_{R1}+L_S+L_{R2})<760\times 10^{-7}/P_R \quad (11)$$

Compared to the speed of water permeation in a diameter direction of the impermeable layer 21, the speed of water permeation in an axial direction thereof is large enough. For this reason, when a plurality of the cables 3 and 7 with different impermeability performances are connected in the axial direction, the total impermeability performance can be represented, not by the impermeability performance at each part, but by the average impermeability performance in the longitudinal direction derived from the equation (3). Therefore, disposing the cable 7 that has an excellent impermeability performance at the deepest seabed allows the impermeability performance of the entire undersea cable 10 to be improved. That is, satisfying the equation (11) can satisfy the impermeability performance of the cable as a whole.

Calculation Examples

A calculation for the ocean floating installations that are installed at a water depth of 121.5 m with an interval of 2 km will be performed. From the water pressure distribution shown in FIG. 6(b) in which the cables are disposed as shown in FIG. 6(a), $\int P_{WR1}$ (L) dL and $\int P_{WR2}$ (L) dL can be calculated. That is, the integral of the water pressure distribution for the parts of the undersea cable that are not in contact with the seabed (the area of the corresponding parts in FIG. 6(b)) can be calculated. This value varies according to the installation forms of the cables (the positions of the buoy and the like).

Here, it is assumed, for example, that the forms of the cables 3 on both sides are the same and that the integral for the water pressure distribution of the parts of the undersea cable that are not in contact with the seabed (the length of the cable is 290 m) is $1.57 \cdot 10^6$. Also, let it assume that the length of the entire cable calculated at this occasion is 2178 m. Also, the impermeability performance of the cable 3 is assumed to be $2.49 \cdot 10^{-8}$ (g·cm)/(cm²·day·mmHg).

From the equation (11), $$[\int P_{WR1}(L)dL+\int P_{WR2}(L)dL]<760\times 10^{-7}\cdot 2178/(2.49\cdot 10^8)$$

Also, since $\int P_{WR1}$ (L) dL=$\int P_{WR2}$ (L) dL, 2 $\int P_{WR1}$ (L) dL<$6.65 \cdot 10^6$ Therefore, $$\int P_{WR1}(L)dL<3.32 \cdot 10^6 \quad (12)$$

The left side of the equation (12) represents the area of $L_{R1}$ in FIG. 6(b). For the integral of the water pressure distribution of the cable 3 to satisfy the equation (12), $L_{R1}<461$ m. Here, let it assume that the length of the undersea cable that is not in contact with the seabed is 290 m. The length of the cable that is installed on the seabed is 2178 m−290 m×2=1598 m. However, the impermeability performance can be satisfied by connecting the cable 7 of 1256 m or more.

The cable 7 cannot be floating in the sea because of its inferior flexibility. Therefore, in the present example, both impermeability and flexibility can be established if the length of the cable 7 is in the range of 1256 m<$L_S$<1598 m (where the pair of the cables 3 have the same length).

As described above, according to the present embodiment, both impermeability and flexibility can be established since the cables 3 with excellent flexibility and the cable 7 with excellent impermeability are disposed at appropriate positions respectively to be connected with each other.

Particularly, the impermeable layer 21 of the cable 3 can follow the bending of the cable 3 and has a high flexibility since the impermeable layer 21 is formed by the multilayer tape 30 of which the metal layer 31 has depression and protrusion shapes.

Also, since the impermeable layer 21a of the cable 7 is formed by a lead sheath, the cable 7 has a relatively inferior flexibility but exhibits a high impermeability. Therefore, disposing the cable 7 at the seabed means that a cable having a high impermeability performance is disposed at the deepest part, which can improve the impermeability performance of the undersea cable 10 as a whole.

Although the impermeable layer 21 is formed by the multilayer tape 30 and the impermeable layer 21a is formed by a lead sheath in the examples above, the impermeable layers 24 and 24a may be formed by the multilayer tape 30 and a lead sheath respectively. In this case, the impermeability performance of the impermeable layers 24 and 24a can be calculated respectively in the similar way.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

DESCRIPTION OF NOTATIONS

1 . . . ocean floating installation
3 . . . cable
5a, 5b . . . connection part
7 . . . cable
9 . . . buoy
10 . . . undersea cable
11 . . . mooring rope
13 . . . power cable
15 . . . conducting portion
17 . . . insulating portion
19 . . . shielding layer
21, 21a . . . impermeable layer
22 . . . corrosion-protective layer
23a, 23b . . . armoring
24, 24a . . . impermeable layer
25 . . . external anti-corrosive layer
26 . . . external protective layer 27 ... intermediate layer
29 ... optical cable
30 ... multilayer tape
31 ... metal layer
33a, 33b ... resin covering portion
35a ... protrusion portion
35b ... recess portion
38 ... lapped portion

What is claimed is:

1. An undersea cable comprising:
a first cable having an impermeable layer formed by winding a tape-shaped component; and
a second cable having an impermeable layer formed of a lead sheath, wherein
each of the first cable and the second cable comprises at least a power cable and armoring portions wherein the power cable includes a conductor on which an insulating layer, a shielding layer, an impermeable layer, and an anti-corrosive layer are formed in sequence and the armoring portions are formed by disposing a plurality of wire material on the periphery side of the whole of a plurality of the power cables in the circumferential direction of the periphery of the whole power cables and providing the wire materials helically in the axial direction of the power cables; and
the second cable is placed between a pair of the first cables to be connected thereto.

2. The undersea cable according to claim 1, wherein:
the tape-shaped component is a multilayer tape in which a metal layer is interposed by resin layers; and
the metal layer of the multilayer tape has at least either protrusion portions or recess portions that are repeatedly formed thereon.

3. The undersea cable according to claim 1, wherein:
an external impermeable layer is provided on the periphery side of the armoring portions;
the external impermeable layer of the first cable is formed by winding a tape-shaped component;
and the external impermeable layer of the second cable is formed of a lead sheath.

4. An undersea cable installation structure that is installed undersea comprising:
a first cable having an impermeable layer formed by winding a tape-shaped component; and
a second cable having an impermeable layer formed of a lead sheath, wherein
each of the first cable and the second cable comprises at least a power cable and armoring portions wherein the power cable includes a conductor on which an insulating layer, a shielding layer, an impermeable layer, and an anti-corrosive layer are formed in sequence and the armoring portions are formed by disposing a plurality of wire material on the periphery side of the whole of a plurality of the power cables in the circumferential direction of the periphery of the whole power cables and providing the wire materials helically in the axial direction of the power cables;
the second cable is placed between a pair of the first cables to be connected thereto; and
an end of the first cable is connected to a floating installation.

5. The undersea cable installation structure according to claim 4, wherein:
the second cable is positioned on the seabed over the full length thereof.

6. The undersea cable installation structure according to claim 4, wherein:
the length of each of the first cables is equal to or greater than the water depth; and
the following relationship is satisfied:

$$[\int P_{WR1}(L)dL + \int P_{WR2}(L)dL]/(L_{R1}+L_S+L_{R2}) < 760 \times 10^{-7}/P_R$$

wherein $P_{WR1}(L)$ is a water pressure (mmHg) given to one of the first cables at a position of a length L, $P_{WR2}(L)$ is a water pressure (mmHg) given to the other first cable at a position of a length L, $L_{R1}$ is a full length (m) of one of the first cables, $L_{R2}$ is a full length (m) of the other first cable, $L_S$ is a full length (m) of the second cable, and $P_R$ is an impermeability performance of the first cable (g·cm/cm²·day·mmHg).

7. A method for installing an undersea cable including a first cable which has an impermeable layer formed by winding a tape-shaped component and a second cable having an impermeable layer formed of a lead sheath, wherein each of the first cable and the second cable comprises at least a power cable and armoring portions in which the power cable includes a conductor on which an insulating layer, a shielding layer, the impermeable layer, and an anti-corrosive layer are formed in sequence and the armoring portions are formed by disposing a plurality of wire material on the periphery side of the whole of a plurality of the power cables in the circumferential direction of the periphery of the whole power cables and providing the wire materials helically in the axial direction of the power cables, the method comprising:
connecting a pair of the first cables to floating installations that are distant from one another; and
connecting the pairs of the first cables by the second cable on the ocean.

8. A method for installing an undersea cable including a pair of first cables each of which has an impermeable layer formed by winding a tape-shaped component and a second cable which has an impermeable layer formed of a lead sheath, wherein each of the first cable and the second cable comprises at least a power cable and armoring portions in which the power cable includes a conductor on which an insulating layer, a shielding layer, the impermeable layer, and an anti-corrosive layer are formed in sequence and the armoring portions are formed by disposing a plurality of wire material on the periphery side of the whole of a plurality of the power cables in the circumferential direction of the periphery of the whole power cables and providing the wire materials helically in the axial direction of the power cables, the method comprising:
connecting one of the first cables and the second cable with each other in advance;
connecting a pair of the first cables to floating installations that are distant from one another; and
connecting the other first cable and the second cable on the ocean.

9. A method for installing an undersea cable including a pair of first cables each of which has an impermeable layer formed by winding a tape-shaped component and a pair of second cables each of which has an impermeable layer formed of a lead sheath, wherein each of the first cable and the second cable comprises at least a power cable and armoring portions in which the power cable includes a conductor on which an insulating layer, a shielding layer, the impermeable layer, and an anti-corrosive layer are formed in sequence and the armoring portions are formed by disposing a plurality of wire material on the periphery side of the whole of a plurality of the power cables in the circumferential direction of the periphery of the whole power cables and providing the wire materials helically in the axial direction of the power cables, the method comprising:
  connecting each of the first cables and each of the second cable with each other in advance;
  connecting a pair of the first cables to floating installations that are distant from one another; and
  connecting the second cables to one another on the ocean.

* * * * *